(12) United States Patent
Beveridge

(10) Patent No.: US 7,680,684 B1
(45) Date of Patent: Mar. 16, 2010

(54) RESOURCING OF STAFF FOR EVENTS

(75) Inventor: Lynelle Ungh-Thanh Beveridge, Epping (AU)

(73) Assignee: International Business Machines Corporation, Armonk, NY (US)

( * ) Notice: Subject to any disclaimer, the term of this patent is extended or adjusted under 35 U.S.C. 154(b) by 2236 days.

(21) Appl. No.: 09/658,951

(22) Filed: Sep. 11, 2000

(51) Int. Cl.
*G06F 15/02* (2006.01)
(52) U.S. Cl. .................................. 705/9; 705/1; 705/8
(58) Field of Classification Search .............. 705/1, 705/8, 9
See application file for complete search history.

(56) References Cited

U.S. PATENT DOCUMENTS

| | | | |
|---|---|---|---|
| 5,918,010 A * | 6/1999 | Appleman et al. | 709/203 |
| 5,960,406 A * | 9/1999 | Rasansky et al. | 705/9 |
| 6,297,819 B1 * | 10/2001 | Furst | 345/733 |
| 6,334,133 B1 * | 12/2001 | Thompson et al. | 707/104.1 |
| 6,363,376 B1 * | 3/2002 | Wiens et al. | 707/3 |
| 6,385,620 B1 * | 5/2002 | Kurzius et al. | 707/104.1 |
| 6,480,958 B1 * | 11/2002 | Harrington | 713/184 |

* cited by examiner

*Primary Examiner*—Robert W Morgan
(74) *Attorney, Agent, or Firm*—Anthony V. S. England; William H. Steinberg

(57) ABSTRACT

The present invention relates to resourcing of staff for performing tasks at an event. The present invention also relates to providing of a logistics requirement list for the staff. A method is provided whereby a electronic message is forwarded to a candidate by a resource management system 410, informing the candidate that their application has been accepted, providing the candidate with a staff identification and requesting the candidate to register. To register, the candidate connects to a first Internet Web site 451, from which the candidate receives information and instruction to connect with a second web site 452. The candidate gains access to the second web site 452 by use of the staff identification. The candidate then provides the requested information to complete registration.

14 Claims, 3 Drawing Sheets

RESOURCING OF STAFF FOR EVENTS

TECHNICAL FIELD OF THE INVENTION

The present invention relates generally to resourcing and, in particular, to resourcing of staff for performing tasks at an event. The present invention also relates to providing of a logistics requirement list for the staff.

In this specification "event" is to be understood as including a forthcoming circumstance where staff is required to perform a task. It typically has an approaching start date and a predefined duration.

BACKGROUND ART

Ever more businesses and processes are moving into a project-orientated environment. A project or event needs staff, and logistics allocated to those staff for the project to be successful. For example, for an engineering project in a remote location, a certain number of staff, each with very specific skills must be recruited for the project. The staff may be recruited from a pool of available project staff, or alternatively from the wider employment market.

Each staff member also requires certain resources or logistics to perform the task at hand more efficiently. For example, in the remote location, each staff member would require some level of accommodation. Transport between the accommodation and the project site must also be provided, whereas certain members of staff may require transport as part of their function. Other logistics also include communication, clothing, meals and so forth.

Typically, each of the groups responsible for planning the event would compile a list containing their staffing and logistics requirements. These lists would typically be held in various spreadsheets or small database systems, and such information is filtered to other groups in an adhoc manner and typically in differing formats. Such a localised staffing process causes a lack of overall co-ordination, with no direct process to ensure that all requirements were met.

Typically, each group would pass their staffing requirements to a Company or organisation's Human Resources department for recruitment of the required staff and their logistics requirements to a logistics department. In terms of recruitment, typically advertisements are placed by the Human Resources department, inviting appropriately skilled candidates to apply. The Logistics department starts independently to draw up a logistics requirement list for the project. This causes a lot of wastage as the logistics requirement list is typically drawn up for the worst case scenario.

There is therefore a requirement for more automated and coordinated resourcing of staff for performing tasks at an event, as well as an improved method of determining the logistics needs for the event.

DISCLOSURE OF THE INVENTION

It is an object of the present invention to substantially overcome, or at least ameliorate, one or more disadvantages of existing arrangements.

According to an aspect of the invention, there is provided a method of resourcing staff to an event. The method comprising the steps of:

forwarding an electronic message to a candidate that includes a staff identification and inviting the candidate to register;

to register, the candidate connects to a first Internet Web site, from which the candidate receives information and instruction to connect with a second web site; and the candidate gains access to the second web site by use of said staff identification, and provides requested information to complete registration.

Preferably, the method comprises the further step of creating a logistics requirements list from at least parts of the provided information. Additionally, the method may comprise the initial steps of:

receiving applications from potential candidates; and
selecting qualified candidates from said applications.

Preferably, the staff identification includes a user identification and a password.

Another preferable feature is that the staff identification expires once the candidate has gained access to the second web site. This ensures that said candidate only registers once.

According to another aspect of the invention, there is provided a system for resourcing staff to an event. The system comprising:

a plurality of user terminals;
a resourcing system;
a network for interconnecting the user terminals and the resoursing system;
message means for forwarding an electronic message from the resourcing system to a candidate via one of the user terminals, the electronic message including a staff identification and an invitation for the candidate to register;
registration means comprising first and second Web sites, wherein the candidate connects to the first Web site through the network, from which the candidate receives information and instruction to connect with a second Web site, and the candidate gains access to the second web site by use of the staff identification, and provides requested information to complete registration; and
means for storing the requested information.

BRIEF DESCRIPTION OF THE DRAWINGS

A preferred embodiment of the present invention will now be described with reference to the drawings, in which.

DETAILED DESCRIPTION INCLUDING BEST MODE

Figure 1:
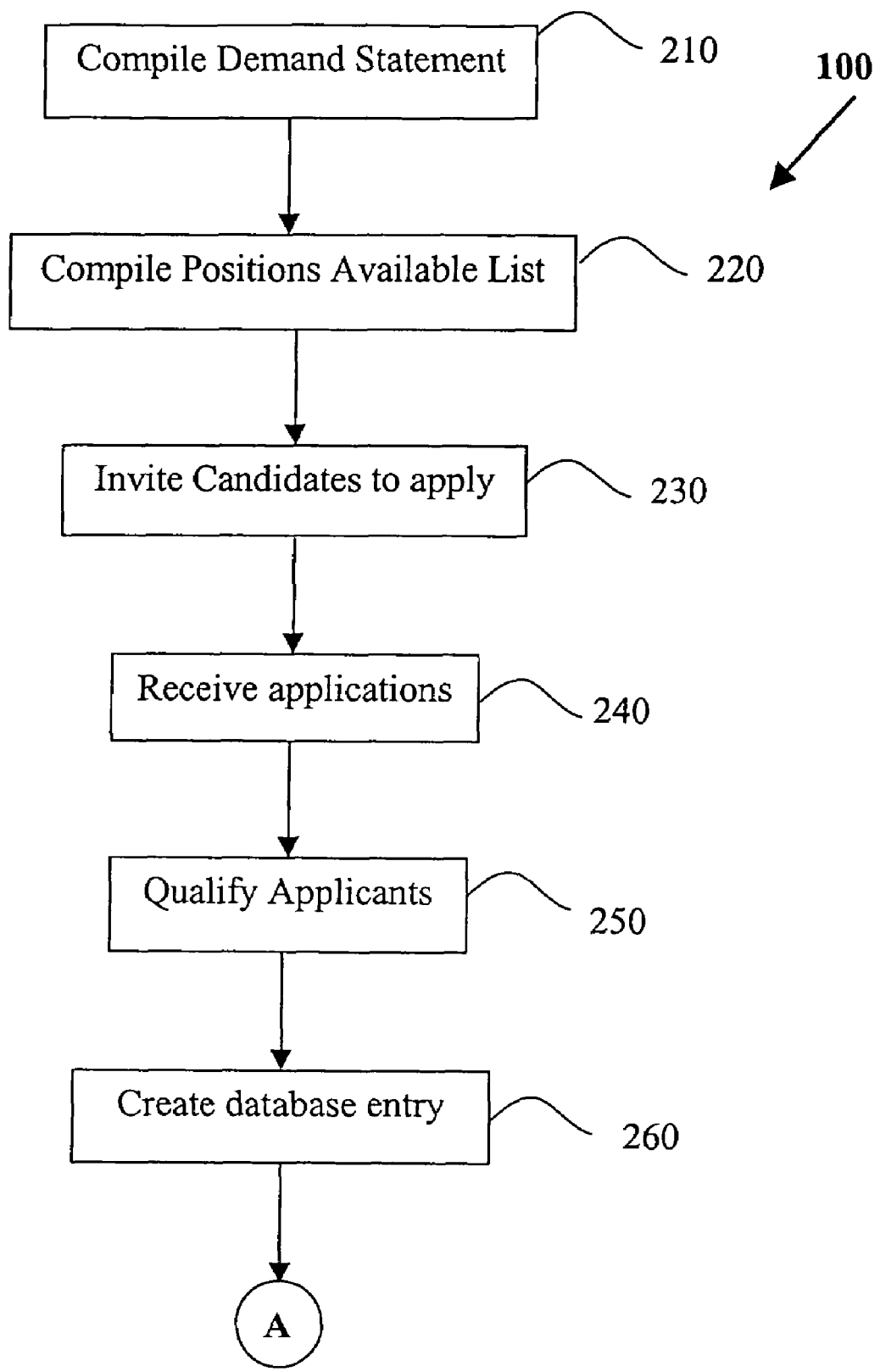
FIG. 1 is a flow diagram of a resource allocation process.
Figure 1:
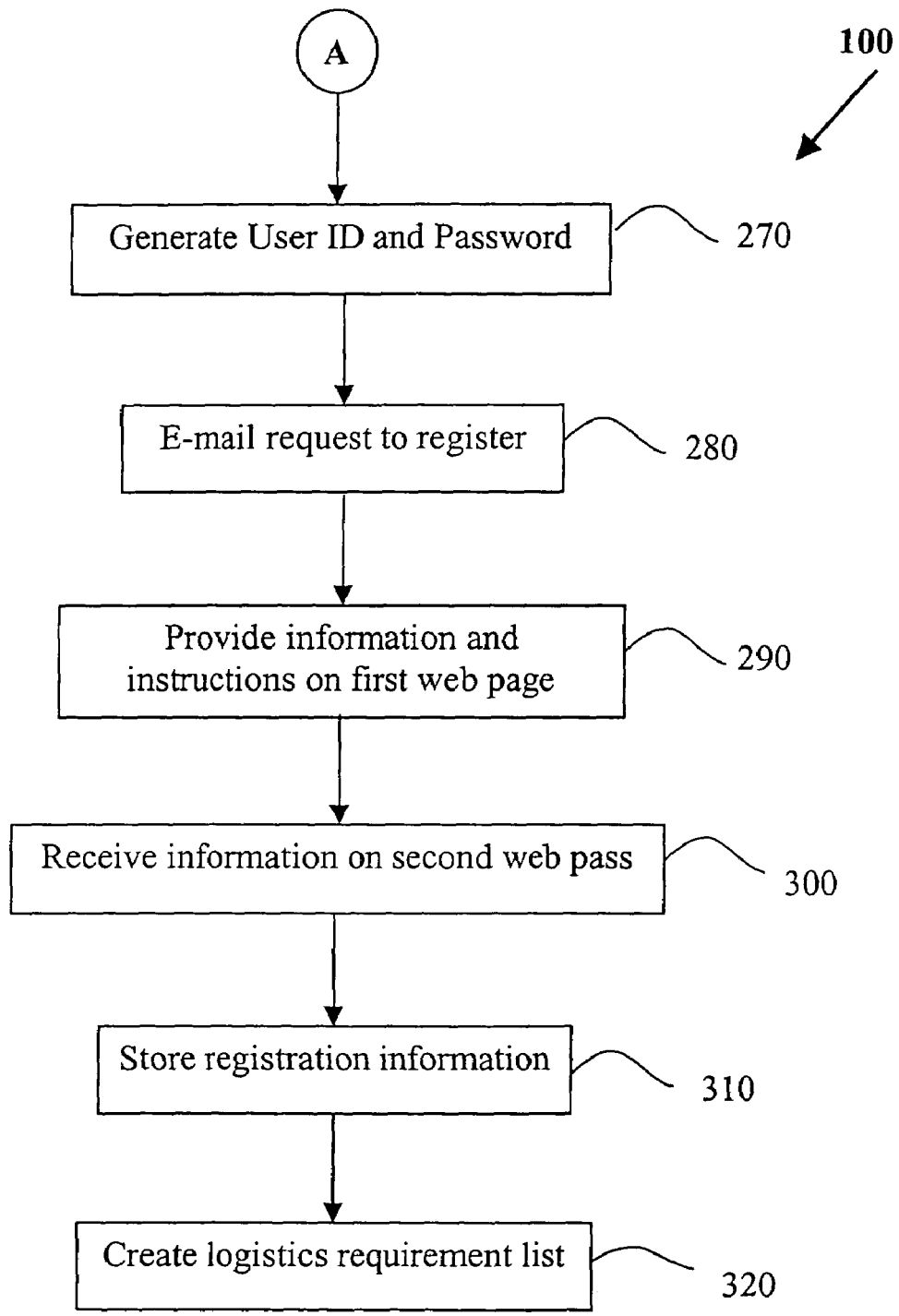
Figure 2:
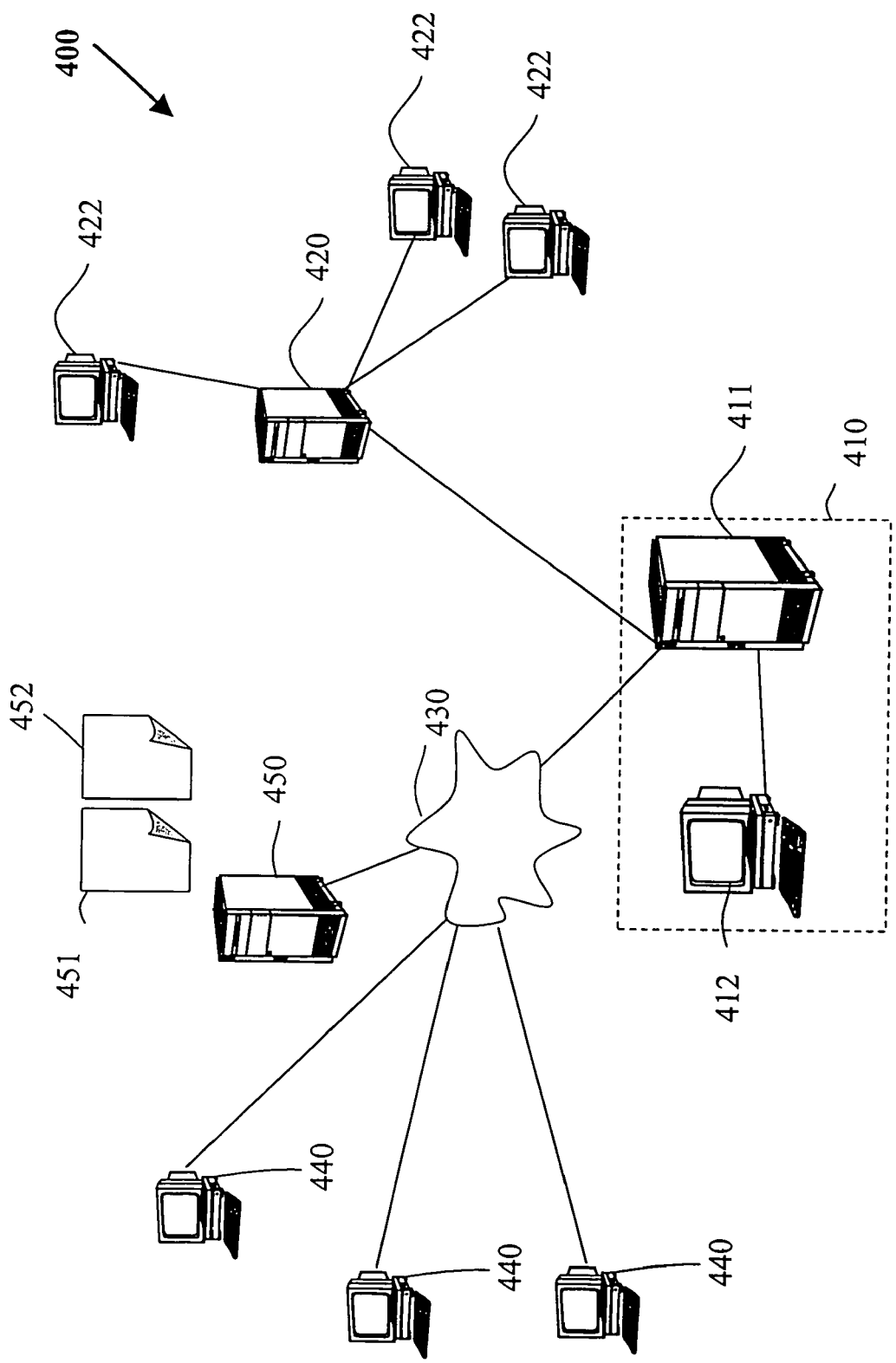
FIG. 2 is schematic flow diagram of a system on which the resource allocation process of FIG. 1 may be implemented.

FIG. 1 shows a resource allocation process 200 that is implemented on a system 400 as shown in FIG. 2. The resource allocation process 200 is for management of staff resourcing for an event, and also for providing a logistics requirement list for the staff. In the preferred embodiment, the system 400 consists of a resource management system 410 which typically includes a server 411 and a number of workstations 412, and a number of logistics workstations 422 connected to the resource management system 410 through a logistics hub 420. The resource management system 410 is also connected to the Internet 430. The interconnection of the server 411, the workstations 412 and 422, and the hub 420 is in a manner which results in a conventional mode of operation known to those in the relevant art.

Referring again to FIG. 1, the resource allocation process 200 starts in step 210 where a Demand Statement is compiled. This Demand Statement is a list of vacancies required for performing a task during the event, as well as the skills required for each of those vacancies. If it is a unique task or a first time the task is performed, then the list is typically compiled by a manager. However, if it is a task that often occurs, the task may have a precompiled Demand Statement.

For example, if the event has an information technology (IT) task, the following vacancies and sub-tasks would exist:

IT Manager: own and manage all IT resources, including equipment and workforce;

IT Engineer: manage and resolve all IT related facilities issues; and

IT Help Desk Co-ordinator: receive IT related enquiries, provide telephone assistance for IT problems, pass unresolved problems to IT Engineer(s).

For the vacancy of IT Manager role, a precompiled demand statement for that sub-task may be as follows:

Operations management;
Staff management experience in a technical environment;
Clear and concise communication skills;
Good interpersonal and motivational skills;
Ability to develop charts, graphs, etc. for training and communications;
Vendor/supplier relationship experience;
Ability to utilise IT management information; and
Work well under pressure.

From the Demand Statement, a Positions Available list is compiled in step 220. The Positions Available list is typically a sub-set of the Demand Statement, and differences between the Demand Statement and the positions available list are typically caused by budgetary constraints. For example, it may be decided that one less IT Engineer would be sufficient for the task of resolving the IT related issues.

A recruitment process follows in steps 230 to 250, in that in step 230 candidates are invited to apply. The candidates may be persons in a pool or resources within an organisation for which vacancies are filled. In such a case, the appropriate candidates with the necessary skills are readily identifiable, and the identified candidates can be directly approached for those vacancies. For an alternative event or task, candidates may be invited to apply by placing advertisements in the media.

In step 240, applications are received from the candidates and in step 250, the applicants are qualified. In the qualification step 250, the applicants' qualifications are compared with the skill requirements of the vacancies that they applied for. Applicants meeting the requirements are known as Qualified Applicants.

The resource allocation process 200 continues to step 260 where a database entry in the resource management system 410 is created for each of the Qualified Applicants. Typically, these entries are automatically created when candidates from a candidates list, or applicants appearing on an applicants list, are marked with a status indicating that they are qualified. The database entry for each qualified applicant typically includes the name of the Qualified Applicant, their allocated function and their accreditation level. The accreditation level is used as indication of the rights to which the applicant is entitled. They include access rights to one or more access-controlled zones or venues, and rights to use transport and meal facilities.

The resource management system 410 generates a user identification and password for each of the Qualified Applicants in step 270. In step 280, an electronic mail (e-mail) message is sent to each Qualified Applicant by the resource management system 410. Referring again to FIG. 2, the Qualified Applicants access their e-mail messages from their respective user computers 440, which are also connected to the Internet 430. The e-mail message informs the Qualified Applicant of the fact that their application has been accepted, provides the Qualified Applicant with more particulars of their function, provides them with their password and user identification, and instructs them to register.

To register, which is performed in steps 290 to 310 (FIG. 1), each Qualified Applicant is instructed in the e-mail message to go to a first web page 451, by using an Internet browser on their user computers 440. This may be performed with a 'Hotlink' within the e-mail message taking the Qualified Applicant directly to the first web page 451. In step a 290 the first web page is downloaded from a web server 450 and displayed to the Qualified Applicant on their user computer 440.

The first web page 451 typically contains information and instructions to the Qualified Applicant on how to proceed to the next step of registration. The instructions may include information that must be obtained by the Qualified Applicant, enabling them to successfully register. This information may include contact details of next of kin, billing information, clothing sizes, dietary requirements and medical requirements.

Once the Qualified Applicant has collected the required information, he or she is required to go to a second web page 452 in step 300. Access to this second web page 452 is restricted and the Qualified Applicant is required to use the user identification and password that they have been provided with, to gain access to this second web page 452. In the second web page 452, the Qualified Applicant is prompted to enter the information they had to collect onto the web page 452. Where possible, pre-defined selections are provided.

Upon all the information being entered by the Qualified Applicant, the information is sent, via the Internet 430, to the resource management system 410 where it is stored, in step 310. This completes the registration and the Qualified Applicants obtain staff status.

In the preferred embodiment, the Qualified Applicant can only gain access to the second web page 452 one time using the user identification and password provided. Once the Qualified Applicant has used the user identification, it is revoked. Attempts to gain access to the second web page 452 with a revoked user identification, would be denied by the web server 450. Therefore, preferably the Qualified Applicant is required to confirm that all the required information has been collected before he is allowed to proceed to the second web page 452. If the required information is not at hand, the Qualified Applicant is returned to the first web page 451.

Finally, in step 320, a logistics requirement list is compiled from the submitted registration information. The logistics requirement list may include:

Accommodation;
Uniforms;
Catering;
Stationery;
Transport;
Phones and pagers;
Office space; and
Furniture.

Changes to the staff database are updated in the logistics requirement list, thereby ensuring that the current staff requirements are met.

The logistics workstations 422 are used to order and provide staff with the correct resources. For example, it is possible to determine exactly how many meals are required and who must be provided with vegetarian or kosher meals, for example. With regards to transport, the system can determine which staff is allocated a vehicle, who must be picked up from their accommodation and when, and who must be allocated with tickets for use on public transport.

Advantages arising from registering staff in this manner include:

Quality control of information—each Qualified Applicant can only register once, and only when they've been confirmed as meeting the skill requirements of the vacancies that they applied for;

Accessibility—Qualified Applicants can register globally;

Reduction of manual labour—the resourcing of staff is more efficient;

Automation of confirmation of registration—confirmation is immediate upon completing of registration.

The resource management system 410 may be specially constructed for the required purposes, or may comprise a general purpose computer 412 and server 411 selectively activated or reconfigured by a computer program stored in the server 411. The steps presented herein are not inherently related to any particular computer or server. Various general-purpose machines may be used with programs in accordance with the teachings herein, as would be readily understood by one skilled in the art. Alternatively, the construction of more specialized apparatus to perform the required method steps may be appropriate.

The foregoing describes only one embodiment of the present invention, and modifications and/or changes can be made thereto without departing from the scope and spirit (of the invention, the embodiment(s) being illustrative and not restrictive.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

I claim:

1. A method of resourcing staff to an event, comprising the steps of:
    a) identifying a candidate for staffing of an event;
    b) forwarding an e-mail message by a resource management system to the candidate, wherein the e-mail message includes a user identification and invites the candidate to a first Internet web site for registering to staff the event, wherein the user identification is for the candidate to enter for gaining access to a second Internet web site, and wherein the e-mail message includes a link to the first Internet web site;
    b) connecting with the candidate at the first Internet web site responsive to the link in the e-mail message taking the candidate to a web page using an Internet browser;
    d) providing information and instruction on the web page for displaying to the candidate, including instruction for connecting with the second web site and a request for the candidate to supply certain information to the second web site for registering;
    e) receiving confirmation from the candidate that the candidate has the certain information ready for supplying to the second web site;
    f) granting the candidate access to the second web site responsive to receiving i) the confirmation from the candidate that the candidate has the certain information ready for supplying to the second web site and ii) the user identification; and
    g) receiving the requested information for registration from the candidate by the second web site.

2. A method according to claim 1, further comprising the steps of:
    receiving applications from potential candidates, wherein step a) includes:
    selecting qualified candidates from the applications, wherein the candidate of step a) is one of the selected candidates.

3. A method according to claim 1, wherein the message of step a) includes a password.

4. A method according to claim 1, further comprising the step of the user identification expiring once the candidate has gained access to the second web site, ensuring that the candidate only registers once.

5. A method according to claim 1, comprising the further step of creating a logistics requirements list from at least parts of the information received in step g).

6. A method of resourcing staff to an event, comprising the steps of:
    a) receiving applications from potential candidates;
    b) selecting qualified candidates from the applications;
    c) forwarding an e-mail message by a resource management system to each of the qualified candidates, wherein each such an e-mail message includes a respective user identification and invites a respective one of the qualified candidates to a first Internet web site for registering to staff the event, wherein such a user identification is for the respective candidate to enter for gaining access to a second Internet web site, and wherein the e-mail message includes a link to the first Internet web site;
    d) connecting with such a qualified candidate at the first Internet web site responsive to the link in the e-mail message taking the candidate to a web page using an Internet browser;
    e) providing information and instruction on the web page for displaying to such a qualified candidate, including instruction for connecting with the second web site and a request for information for the candidate to supply to the second web site for registering;
    f) receiving confirmation from the candidate that the candidate has the certain information ready for supplying to the second web site; and
    g) granting such a qualified candidate access to the second web site responsive to receiving i) the confirmation from the candidate that the candidate has the certain information ready for supplying to the second web site and ii) the candidate's user identification; and
    h) receiving such requested information for registration from such a candidate by the second web site.

7. A method according to claim 6, comprising the further step of creating a logistics requirements list from at least parts of the information received in step h).

8. A method according to claim 6, comprising the step of the user identification expiring once the candidate has gained access to the second web site, ensuring that the candidate only registers once.

9. A system for resourcing staff to an event, the system comprising:
- a plurality of user terminals;
- a resourcing system;
- a network for interconnecting the user terminals and the resourcing system;
- means for identifying a candidate for staffing of an event;
- message means for forwarding an e-mail message by a resource management system to the candidate via one of the user terminals, the e-mail message including a user identification and an invitation for the candidate to a first Internet web site for registering to staff the event, wherein the user identification is for the candidate to enter for gaining access to a second Internet web site, and wherein the e-mail message includes a link to the first Internet web site;
- registration means comprising the first and second Web sites, wherein the first web site is configured for connecting with the candidate through the network responsive to the link in the e-mail message taking the candidate to a web page using an Internet browser through the network and for providing the candidate information and instruction, including instruction for connecting with the second web site and a request for the candidate to supply certain information to the second web site for registering, and wherein the second web site is configured for granting the candidate access to the second web site responsive to receiving i) confirmation from the candidate that the candidate has the certain information ready for supplying to the second web site and ii) the user identification, and the second web site is configured for receiving the requested information for registration from the candidate; and
- means for storing the requested information.

10. A system according to claim 9, wherein the user identification includes a password.

11. A system according to claim 9, further comprising means for expiring the user identification once the candidate has gained access to the second web site.

12. A system according to claim 9, further comprising means for creating a logistics requirements list from at least parts of the information received by the second web site from the candidate.

13. An article of manufacture comprising a computer usable medium having computer readable program code means embodied therein for causing resourcing staff to an event, the computer readable program code means in said article of manufacture comprising computer readable program code means for causing a computer to effect the steps of claim 1.

14. An article of manufacture comprising a computer usable medium having computer readable program code means embodied therein for causing resourcing staff to an event, the computer readable program code means in said article of manufacture comprising computer readable program code means for causing a computer to effect the steps of claim 6.

* * * * *